(12) United States Patent
Bae

(10) Patent No.: US 7,520,704 B2
(45) Date of Patent: Apr. 21, 2009

(54) TOOL ASSEMBLY

(75) Inventor: Byung Gyun Bae, Taegu (KR)

(73) Assignee: Taegutec Ltd. (KR)

( * ) Notice: Subject to any disclaimer, the term of this patent is extended or adjusted under 35 U.S.C. 154(b) by 0 days.

(21) Appl. No.: 11/960,858

(22) Filed: Dec. 20, 2007

(65) Prior Publication Data

US 2008/0279645 A1 Nov. 13, 2008

(30) Foreign Application Priority Data

May 9, 2007 (KR) .................. 10-2007-0044995

(51) Int. Cl.
*B23C 5/00* (2006.01)
*B23B 31/107* (2006.01)
(52) U.S. Cl. ........................ 409/234; 279/83
(58) Field of Classification Search ............. 409/234, 409/232; 279/83, 76, 97, 137, 141, 143; 408/239 A, 239 R; 403/361, 362; 82/158, 82/160
See application file for complete search history.

(56) References Cited

U.S. PATENT DOCUMENTS

| | | | | |
|---|---|---|---|---|
| 387,475 A * | 8/1888 | Whaling | ...................... | 279/83 |
| 1,958,817 A * | 5/1934 | Gase | ............................ | 279/83 |
| 2,167,014 A * | 7/1939 | Verderber | .................... | 279/83 |
| 3,557,419 A * | 1/1971 | Flannery | ..................... | 279/83 |
| 3,586,344 A * | 6/1971 | Nixon | .......................... | 279/83 |
| 4,063,843 A * | 12/1977 | Barkley et al. | .............. | 408/146 |
| 4,971,491 A * | 11/1990 | Cook | .......................... | 409/234 |
| 5,403,134 A * | 4/1995 | Andersson et al. | .......... | 409/234 |
| 5,468,102 A * | 11/1995 | Stojanovski | ................ | 409/234 |
| 5,660,400 A * | 8/1997 | Kasmeier et al. | ............. | 279/83 |
| 6,299,180 B1 * | 10/2001 | Satran et al. | .................. | 279/83 |
| 6,299,394 B1 * | 10/2001 | Stojanovski | ................ | 409/234 |
| 7,281,888 B1 * | 10/2007 | Kaiser et al. | ................ | 409/234 |

FOREIGN PATENT DOCUMENTS

| | | |
|---|---|---|
| JP | 2005-125432 | 5/2005 |
| KR | 10-2005-0011352 | 1/2005 |
| WO | WO-88/10165 A1 * | 12/1988 |

* cited by examiner

*Primary Examiner*—Erica E Cadugan
(74) *Attorney, Agent, or Firm*—Cantor Colburn LLP

(57) ABSTRACT

The present invention discloses a tool assembly being capable of reducing considerably an axial length of a working member (tool), in particular, a length of a male spigot to be coupled with a coupling member and transmitting a torque to a working member without generating a loss by means of a secure coupling between a male spigot of a working member (tool) having a short length and a coupling member. A tool assembly according to the present invention comprises a tool including a head to be approached to a work-piece, a male spigot extended from a rear end of the head and a flange formed at a border portion between the head and the male spigot and having a ring shaped flat rear surface; and a coupling member consisting of a first section having a cavity formed on a central portion of a front side thereof for receiving the male spigot and a second section formed at a rear side of the first section and connected to a driving means. The male spigot has a tapered surface formed on a side thereof, a through hole communicated with the cavity is formed on a side of the first section of the coupling member, and an end of a coupling screw coupled with the through holes is capable of pressurizing the tapered surface of the male spigot received in the cavity.

6 Claims, 2 Drawing Sheets

FIG. 4 (New)
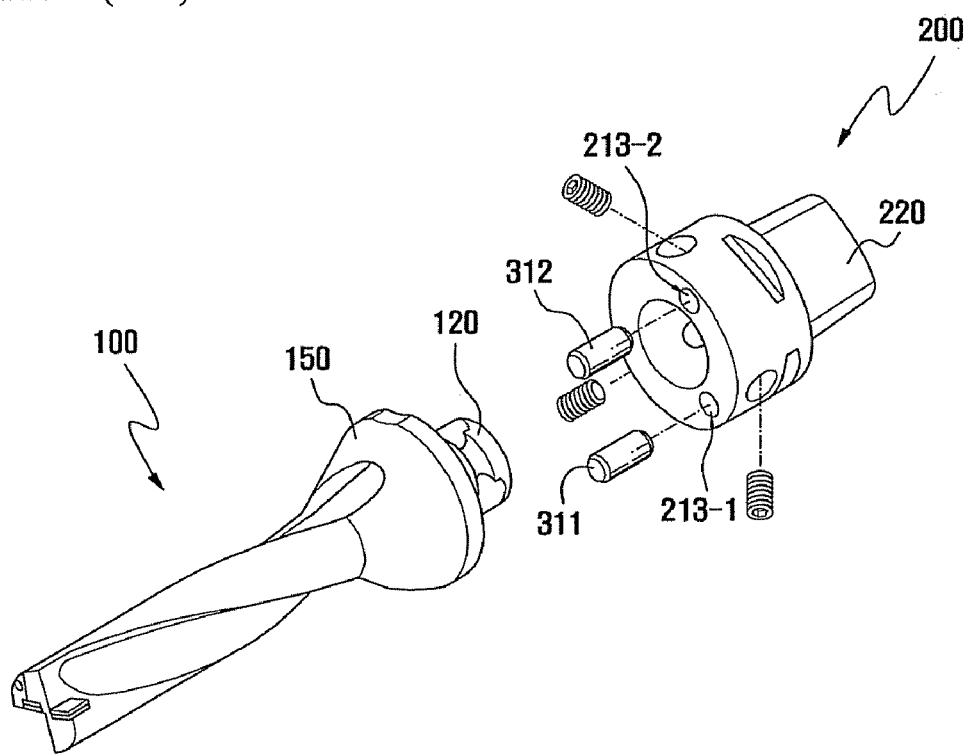

TOOL ASSEMBLY

This application claims the benefit of the filing date of Korean Patent Application No. 10-2007-0044995 filed on May 9, 2007, in the Korean Intellectual Property Office, the disclosure of which is incorporated herein in its entirety by reference.

BACKGROUND OF THE INVENTION

1. Field of the Invention

The present invention relates a tool assembly, more particularly, to a tool assembly in which a working member is securely coupled with a coupling member and a torque can be transmitted to a working member without a loss.

2. Description of the Related Art

In general, a cutting tool is used in the field of cutting machining such as drilling, milling, and turning. Within the fields of drilling and milling, a tool having a rotary character is useful for machining a fixed and movable workpiece, and a tool for turning machining is fixed and has the purpose of machining work-piece which is rotating.

Conventionally, a drilling tool is divided into a coupling member and a working member the coupling member to be coupled to a driving shaft of a driving mean is compatible with a certain type of machine tool or a tool holder. That is, the coupling member has a shape corresponding to that of the tool holder.

The working member comprises a head oil which chip channels and cooling-medium channels are formed, and cutting inserts are detachably mounted to a front end of the head.

The working member and the coupling member are permanently coupled with each other through an interface between the coupling member and a male spigot that is a rear end portion of the working member. Male-female joints which are fit in a press-fit manner are used as the permanent coupling means between the male spigot and the coupling member.

More precisely, the male spigot that is a rear end portion of the working member is pressed into a seating portion formed at a front end of the coupling member when the seating portion is widened by heating. The coupling member is then cooled and shrunk, and so the coupling member and the male spigot (that is, the working member) are coupled.

In order to transmit the requisite torque between the seating portion of the coupling member and the male spigot of the working member with a sufficient safety margin, a sufficient large contact area should be existed between the male spigot and the seating portion. To secure the above contact area, the male spigot and the seating portion should have a considerable axial extension.

Accordingly, in most cases, an axial length of the mal spigot of the working member is at least 1.5 times greater than a diameter of the head. The fact that the male spigot has the considerable length means that the drilling tool has a great total length.

The tool assembly having the great length has the problems of a great dead weight, a high consumption of material in the manufacturing process and an extra great space in connection with storage and transportation. In addition, the great length of the tool assembly means that the tool assembly is set in a vibration circumstance during the machining process.

In order to solve the above mentioned problems, it is desirable to reduce a total length of the drilling tool as much as possible. Accordingly, the study has been recently made to reduce a length of the male spigot of the working member and a female seating portion of the coupling member while a torque transmission performance between the coupling member and the working member is maintained.

SUMMARY OF THE INVENTION

Accordingly, the present invention is conceived to solve the aforementioned problems caused by a coupling structure between a working member and a coupling member, an object of the present invention is to provide a tool assembly being capable of reducing considerably an axial length of a working member (tool), in particular, a length of a male spigot to be coupled with a coupling member.

Another object of the present invention is to provide a tool assembly in which a male spigot of a working member (tool) having a short length can be securely coupled with a coupling member to transmit a torque to a working member without generating a loss.

In order to achieve the above objects, a tool assembly according to the present invention comprises a tool including a head to be approached to a work-piece, a male spigot extended from a rear end of the head and a flange formed at a border portion between the head and the male spigot and having a ring shaped flat rear surface; and a coupling member consisting of a first section having a cavity formed on a central portion of a front side thereof for receiving the male spigot and a second section formed at a rear side of the first section and connected to a driving means.

The male spigot has a tapered surface formed on a side thereof and a through hole communicated with the cavity is formed on a side of the first section of the coupling member, and so an end of a coupling screw coupled with the through holes is capable of pressurizing the tapered surface of the male spigot received in the cavity.

The tapered surface formed on the male spigot is inclined from a central portion in the widthwise direction of the male spigot toward an edge of a rear end portion of the male spigot, and the through holes formed on the first section of the coupling member is formed in the direction perpendicular to the tapered surface of the mal spigot, and so a screw coupled to the through hole is perpendicularly contacted to the tapered surface of the male spigot.

On the other hand, a plurality of through holes formed on the first section are disposed on a circumference at regular angular intervals and a plurality of tapered surfaces formed on the male spigot are disposed on a circumference at regular angular intervals.

In addition, the flange of the tool has a coupling recess formed on a flat rear surface thereof, and the first section of the coupling member has a coupling recess formed on a periphery of the cavity and corresponding to the recess formed on the flange.

To couple the tool with the coupling member, one end portion of a pin is received in the coupling recess formed of the flange of the tool and the other end portion is received in the coupling recess formed on the first section of the coupling member.

Here, it is preferred that a plurality of coupling recesses formed on the first section of the coupling member and a plurality of coupling recess formed on the flange of the tool are disposed on a circumference at irregular angular interval.

BRIEF DESCRIPTION OF THE DRAWINGS

FIG. 4 is a schematic representation of an embodiment of the tool assembly wherein the coupling recesses are disposed at an irregular angular interval.

DESCRIPTION OF THE PREFERRED EMBODIMENTS

Hereinafter, the preferred embodiment of the present invention is described in detail with reference with the accompanying drawings.

Figure 1:
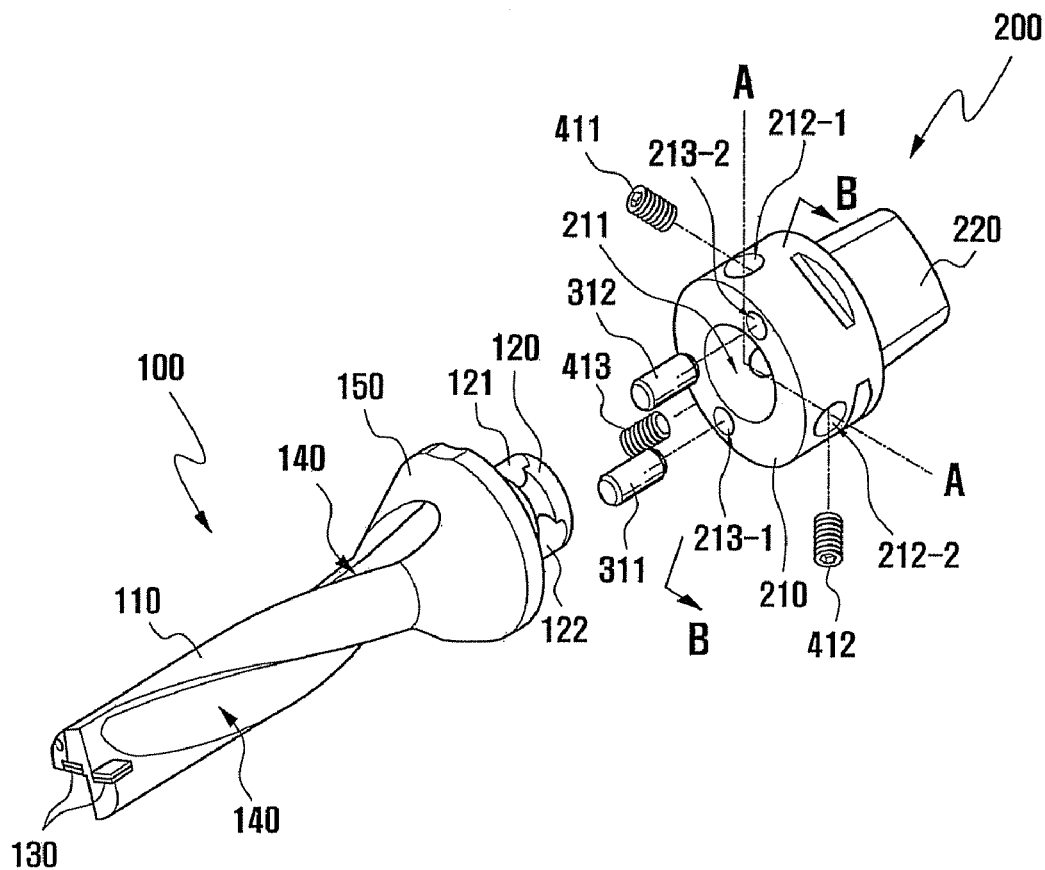
FIG. 1 is an exploded perspective view of a tool assembly according to one embodiment of the present invention.

FIG. 1 is an exploded perspective view of a tool assembly according to one embodiment of the present invention. The tool assembly according to one embodiment of the present invention comprises a working member 100 (hereinafter, referred to as "tool") and a coupling member 200.

The tool 100 includes a head 110 contacted with a work-piece and a rear protrusion section 120 extended from a rear end of the head and formed integrally with the head 110. At least one cutting insert 130 is mounted to a front end of the head 110 for machining a work-piece, and a chip groove 140 is formed on an outer circumference surface of the head 110 for receiving a chip generated when the working piece is machined.

Chip is guided and moved along the chip groove 140, the chip groove 140 performing such function is formed in a spiral shape through the entire length of the head 140.

A rear-protrusion 120 (hereinafter, referred to as "male spigot") having a certain length is formed at a rear end portion of the head 110, at least one tapered surfaces 121 and 122 are formed on an outer surface of the male spigot 120. Each of the tapered surfaces 121 and 122 is a surface which is inclined from a central portion in the widthwise direction of the male spigot 120 toward an edge of a rear end portion (that is, an end corresponding to the coupling member), this taper surface is contacted with a clamping screw described later.

In the embodiment of the present invention, on the other hand, three tapered surfaces are formed on an outer circumference surface of the cylindrical male spigot 120 at angular intervals of 120°. In FIG. 1 which is a perspective view, however, only two tapered surfaces 121, 122 are shown.

A flange 150 having a large diameter is formed at a border portion between the head 110 and the male spigot 120. Although not shown in FIG. 1 that is a perspective view, one or more coupling recesses are formed on a ring-shaped rear flat surface (i.e., a surface around the male spigot 120) of the flange 150.

The coupling member 200 is divided into a cylindrical first section 210 corresponding to the male spigot 120 of the tool 100 and a second section 220 coupled to a driving shaft of a driving means provided in a machining equipment (not shown).

The first section 210 has a cavity 211 formed on a central portion of a front end thereof, and the male spigot 120 of the tool 100 is accommodated in this cavity 211. A periphery of the cavity 211 is a flat surface, at least one coupling recesses 213-1 and 213-2 are formed on periphery of the cavity 211. First end portions of pins 311 and 312 are received in the coupling recesses 213-1 and 213-2, respectively, and second end portions of the pins are received in the coupling recesses formed on a periphery (that is, around the male spigot 120) of the rear surface of the flange 150 of the tool 100, respectively.

A plurality of through holes 212-1 and 212-2 are formed on a side portion of the first section 210 of the coupling member 200. Each of the through holes 212-1 and 212-2 is inclined with respect to a central line in a lengthwise direction of the first section 210. At this time, it is preferred that an incline direction of each of the through holes 212-1 and 212-2 is perpendicular to an incline direction of the corresponding one of the tapered surfaces 121 and 122 formed on the male spigot 120 of the tool 100. A detailed structure and function thereof will be illustrated later.

Each of the through holes 212-1 and 212-2 is extended from an outer circumference surface of the first section 210 to the cavity 211 and a spiral is formed on an inner circumference surface of each through hole. Accordingly, each of clamping screws 411, 412 and 413 is screw-coupled with and received in the corresponding one of the through holes 212-1 and 212-2, and an end portion thereof is protruded by a certain length to the cavity 211.

An assembling process of the tool assembly according to the embodiment of the present invention constructed as described above is illustrated with reference to the drawings.

Figure 2:
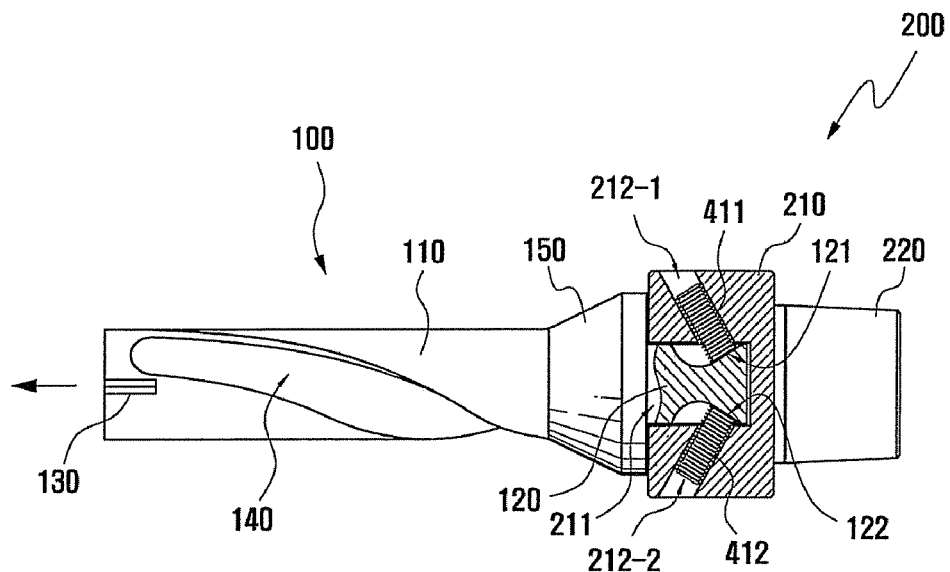
FIG. 2 is at sectional view taken along the line A-A in FIG. 1.
Figure 3:
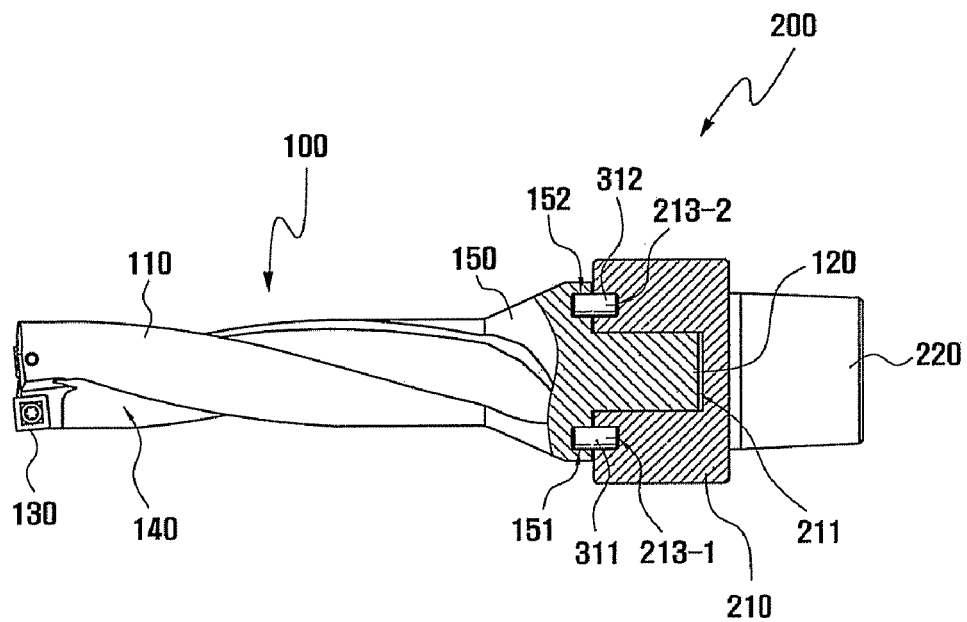
FIG. 3 is a sectional view taken along the line B-B in FIG. 1.

FIG. 2 is a sectional view taken along the line A-A in FIG. 1, and FIG. 3 is a sectional view taken along the line B-B in FIG. 1. For convenience' sake, only the flange 150 and the male spigot 120 of the tool 100 and the first section 210 of the coupling member 200 are showed in section.

First, a first end portion of each of the pins 311 and 312 is inserted in each of the coupling recesses 213-1 and 213-2 formed on a front surface of the first section 210 of the coupling member 200, and the tool 100 is then coupled with the coupling member 200.

The male spigot 120 of the tool 100 is received in the cavity 211 formed on the first section 210 of the coupling member 200. Simultaneously, a second end portion of each of the pins 311 and 312 is inserted in each of the coupling recesses 151 and 152 formed on a periphery of a rear surface of the flange 150. Therefore, the coupling member 200 and the tool 100 are coupled with each other by means of the male spigot 120, the cavity 211 and a plurality of pins 311 and 312.

Here, a cylindrical member is generally utilized as the pins 311 and 312, however, the pin having various shapes such as a spherical shaped member may be utilized as the pin.

In the cavity 211 formed on the first section 210, on the other hand, a plurality of tapered surface 121 and 121 formed on an outer circumference surface of the male spigot 120 correspond one to one to a plurality of through holes 212-1 and 212-2 formed on the first section 210 of the coupling member 200.

In this state, once each of the clamping screws 411, 412 and 413 is inserted and rotated in each of the through holes 212-1 and 212-2 formed on the first section 210 of the coupling member 200, each of the clamping screws 411, 412 and 413 is screw-coupled with spiral formed on an inner circumference surface of each of the through holes 212-1 and 212-2. Consequently, the clamping screws 411, 412 and 413 are coupled with the coupling member 200.

Once the clamping screws 411, 412 and 413 are completely received in the through holes 212-1 and 212-2, an end portion of each clamping screw is protruded to the cavity 211. As described above, since the tapered surfaces 121 and 121 formed on an outer circumference surface of the male spigot 120 correspond one to one to the through holes 212-1 and 212-2 formed on the first section 210 of the coupling member 200 in the cavity 211, the clamping screws 411, 412 and 413 pressurize the tapered surfaces 121 and 122 of the male spigot 120, respectively.

Here, since an incline direction of each of the through holes 212-1 and 212-2 is perpendicular to an incline direction of the corresponding one of the tapered surfaces 121 and 122 formed on the male spigot 120, each of the clamping screws 411, 412 and 413 is also perpendicular to the corresponding one of the tapered surfaces 121 and 122. Accordingly, a coupling force of each of the clamping screws 411, 412 and 413 exerts perpendicularly to the corresponding one of the tapered surfaces 121 and 122 so that the tool 100 is securely coupled with the coupling member 200.

In such structure, an axial movement (in the arrow direction in FIG. 2) and a radial movement of the tool 100 with respect to the coupling member 200 can be perfectly inhibited.

The tool assembly constructed as described above can obtain the advantages as follows.

As described above, a portion of each of the pins 311 and 312 inserted in the coupling recesses 213-1 and 213-2 formed on the first section 210 of the coupling member 200 is inserted in received each of the coupling recesses 151 and 152 formed on the flange 150 of the tool 100. Accordingly, a rotational force of the coupling member 200 which is rotating by a driving force of the driving means is transmitted via the pins 211 and 212, and so a loss of the rotational force is not generated when the rotational force is transmitted to the tool 100.

Ends of the clamping screws 411, 412 and 413 received in and screw-coupled with the through holes 212-1, 212-2 of the first section 210 of the coupling member 200 are contacted with the tapered surfaces 121 and 122 formed on the male spigot 120 of the tool 100, respectively.

Accordingly, the clumping screws 411, 412 and 413 screw-coupled with the first section 210 of the coupling member 200 can inhibit the male spigot 120 from being separated from the first section 210 of the coupling member 210 (that is, being moved in the arrow direction in FIG. 2) In particular, since each of the clamping screws 411, 412 and 413 is perpendicular to the corresponding one of the tapered surfaces 121 and 122 of the male spigot 120, a coupling force of each of the clamping screws 411, 412 and 413 is applied perpendicularly to the corresponding one of the tapered surfaces 121 and 122 of the male spigot 120, and so it is possible to inhibit the tool 100 from being separated from the coupling member 20, that is, to maintain securely a coupling state between the tool 100 and the coupling member 200.

In particular, since a rotational force is transmitted to the tool 100 through the pins 311 and 312 and a separation of the tool 100 from the coupling member 200 is inhibited by the clamping screws 411, 412 and 413 and the tapered surfaces 121 and 122 formed on the male spigot 120, a contact area between the male spigot 120 of the tool 100 and the coupling member 200 required for transmitting the rotational force and coupling securely two members can be considerably reduced.

Accordingly, a length of the male spigot 120 and a length of the coupling member 200, that is, the total length of the tool assembly can be minimized.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

For example, although the drawings show that three clamping screws 411, 412 and 413 are provided and three through holes 212-1, 212-2 and 212-3 are formed on a side of the first section 110 of the coupling member 100, the number of the clamping screw and the through hole is not limited thereto.

However, in order to form the tapered surfaces 121 and 122, which are contacted with clamping screws 411, 412 and 413, respectively and having a certain area, on the male spigot 120 without an interference therebetween, it is preferred that three tapered surfaces are disposed on an outer circumference surface of the male spigot 120 at angular intervals of 120° and three through holes 212-1 and 121-2 in which the coupling screws are received are disposed on the first section 210 of the coupling member 200.

In addition, although the drawings show that two coupling recesses 213-1 and 213-2 are formed on a front side of the first section 210 of the coupling member 200 and two pins 311 and 312 to be received the coupling recesses, the number of the coupling recess and the pin is not limited.

Further, although FIG. 1 shows that two coupling recesses 213-1 and 213-2 sue disposed on a straight line passed a center of the first section 210 of the coupling member 200 (Naturally, the coupling recesses formed on a periphery of a rear surface of the flange 150 are disposed in the same manner), it is preferred that the coupling recesses are disposed at angular interval of below 180°, that is, at irregular angular interval.

As above, by disposing irregularly the coupling recesses on the first section 210 of the coupling member 200 and on a periphery of a rear surface of the flange 150, one the pins 311 and 312 are inserted into the coupling recesses, the through holes 212-1 and 212-2 formed on the first section 210 of the coupling member 200 are automatically aligned with the tapered surfaces 121 and 122 formed on the male spigot 120.

In addition, if the coupling recesses 213-1 and 213-2 and the through holes 212-1 and 212-2 are formed, the coupling member 200, in particular, the first section 210 may have the various shapes.

In the tool assembly according to the present invention as described above, the tool and the coupling member can be securely coupled with other to transmit a rotational force to the tool without generating a loss. In addition, by coupling the coupling member and the male spigot of the tool by means of the clamping screws and the tapered surfaces, the coupling member and the tool are coupled with a strong clamping force and a contact area between the coupling member and the male spigot can be minimized so that a length of the coupling member and a length of the male spigot (that is, the total length of the tool assembly) can be minimized.

On the other hand, the above description illustrates the rotary drilling tool as one example, however, the present invention is applicable to a tool mounted fixedly for cutting a work-piece that is rotating.

What is claimed is:

1. A tool assembly, comprising:
 a tool including a head to be approached to a work-piece, a male spigot extended from a rear end of the head and a flange formed at a border portion between the head and the male spigot and having a ring shaped flat rear surface; and
 a coupling member consisting of a first section having a cavity formed on a central portion of a front side thereof for receiving the male spigot and a second section formed at a rear side of the first section and connected to a driving means,
 wherein the male spigot has a plurality of tapered surfaces, each formed on a side thereof, a plurality of through holes, each having a longitudinal axis that is perpendicular to a respective one of the tapered surfaces, are communicated with the cavity, are each disposed in an angularly spaced fashion about a circumference of the first section of the coupling member, and ends of a plurality of coupling screws, each coupled with a respective one of the through holes, are capable of pressurizing the tapered surfaces of the male spigot received in the cavity.

2. The tool assembly according to claim 1, wherein the tapered surfaces are inclined from a central portion of the male spigot in the widthwise direction of the male spigot toward an edge of a rear end portion of the male spigot.

3. The tool assembly according to claim 1, wherein the through holes formed on the first section of the coupling member are formed in the direction perpendicular to the respective tapered surface of the male spigot so that a respective screw coupled to the respective through hole is perpendicularly contacted to the respective tapered surface of the male spigot.

4. The tool assembly according to claim 3, wherein the plurality of through holes formed on the first section are disposed on the circumference at regular angular intervals and the plurality of tapered surfaces formed on the male spigot are disposed on the circumference at regular angular intervals.

5. The tool assembly according to claim 4, wherein the flange of the tool has a coupling recess formed on a flat rear surface thereof, the first section of the coupling member has a coupling recess formed on a periphery of the cavity and corresponding to the recess formed on the flange, and one end portion of a pin is received in the coupling recess formed of the flange of the tool and the other end portion is received in the coupling recess formed on the first section of the coupling member to couple the tool with the coupling member.

6. The tool assembly according to claim 5, wherein a plurality of coupling recesses formed on the first section of the coupling member and a plurality of coupling recess formed on the flange of the tool are disposed on the circumference at an irregular angular interval.

* * * * *